United States Patent [19]

Uda et al.

[11] Patent Number: 4,975,192

[45] Date of Patent: Dec. 4, 1990

[54] CYCLONE SEPARATOR

[75] Inventors: Akira Uda, Kakamigahara; Yoshio Yoshida, Ogaki; Makoto Harada, Minokamo; Masaaki Sato, Kakamigahara, all of Japan

[73] Assignees: Kawasaki Jukogyo Kabushiki Kaisha; Japan Aircraft Development Corporation, Japan

[21] Appl. No.: 378,378

[22] Filed: Jul. 11, 1989

[30] Foreign Application Priority Data

Jul. 11, 1988 [JP] Japan ........................ 63-172449

[51] Int. Cl.[5] ........................ B01D 19/00

[52] U.S. Cl. ........................ 210/512.1; 55/52; 55/199; 55/205; 210/788

[58] Field of Search ........................ 55/1, 52, 199, 203, 55/204, 205, 447, 448, 449, 460; 210/512.1, 788

[56] References Cited

U.S. PATENT DOCUMENTS 2,323,525 7/1943 Ebel et al. ........................ 55/205

2,765,867 10/1956 Revalliei et al. ........................ 55/205 X

*Primary Examiner*—Charles Hart

*Attorney, Agent, or Firm*—Stevens, Davis, Miller and Mosher

[57] ABSTRACT

A cyclone separator including a cylindrical vessel having a tangentially extending inlet at one axial end and a tangentially extending outlet at the other axial end so that fluid is introduced into the vessel from the inlet and produces a swirl flowing to the outlet. A capturing groove is formed around the vessel and opened to the vessel through a gap. A fluid passage is provided to extend from the groove to the axial center of the vessel so that a circulating flow is produced from the groove through the fluid passage to the axial center of the vessel. The portion of the fluid having a high concentration of a substance of a different density is therefore drawn from the area adjacent to the inner wall surface of the vessel to the groove and the substance is captured by the groove.

10 Claims, 3 Drawing Sheets

CYCLONE SEPARATOR

BACKGROUND OF THE INVENTION

1. Field of the Invention

The present invention relates to a cyclone separator for producing a swirl in a fluid to separate from the fluid a substance which has a density different from the density of the fluid. More specifically, the present invention pertains to a cyclone separator which can be advantageously adopted for separating liquid or fine particles of solids from gas, however, the present invention is not limited to such a use.

2. Description of the Prior Art

A centrifugal separator or a cyclone separator is well known in the art as a separator which is designed to introduce liquid tangentially into a cylindrical vessel to thereby produce a swirl of the liquid so that substances of different density can be separated from the liquid under an influence of centrifugal force produced in the fluid. There is another known type of separator which is designed to be specifically used for a water separator of an air conditioning system and to produce an abrupt change in the flow direction of the air so that water and fine solid particles can be separated from the air.

In the known types of separators, various proposals have been made in order to accomplish a high efficiency of separation. For example, the U.S. Pat. No. 3,843,126 proposes a separator which includes coaxially arranged inner and outer cylinders. Humid air is introduced into the inner cylinder from the bottom in a direction so that the air produces an upwardly directed swirl. The air having a higher water concentration is concentrated under the centrifugal force in the vicinity of the inner wall surface of the inner cylinder and a low pressure is produced in the center of the inner cylinder. The inner cylinder is provided with a plurality of radially extending vent tubes which have radially inner ends opened to positions adjacent to the center of the inner cylinder and radially outer ends opened to an annular space between the inner and outer cylinders. The low pressure produced in the center of the inner cylinder causes a suction to produce a circulation from the annular space through the interior of the inner cylinder and the upper end portion of the to the annular space. The air having a high moisture content flows along the inner wall surface of the inner cylinder and is carried by the aforementioned circulating flow into the annular space between the inner and outer cylinders. The water is then separated from the air and dripped into the bottom of the annular space.

The separator disclosed by the U.S. patent is considered to provide a high separating efficiency as compared with a simple cyclone separator, however, it is disadvantageous in that it is structurally complicated. More specifically, the separator has inner and outer cylinders and radially directed vent tubes must be provided to produce the circulated air flow. It should further be noted that the radially directed vent tubes cause an increase in the flow resistance to the air flow in the inner cylinder so that there will be produced a high pressure loss.

SUMMARY OF THE INVENTION

It is therefore an object of the present invention to solve the aforementioned problems of conventional cyclone separators in which a satisfactory separating efficiency cannot be obtained by a simple structure but a complicated structure is required to accomplish an increased separating efficiency.

Another object of the present invention is to provide a cyclone separator which is relatively simple in structure but can provide a high separating efficiency.

According to the present invention, the above and other objects can be accomplished by a cyclone separator having a cylindrical vessel for producing a swirl of fluid so that substance of a different density can be separated from the fluid. The separator of the present invention is characterized by the fact that at least one fluid passage is provided to have one end opened to an exterior surface of the cylindrical vessel and the other end opened to or in the vicinity of the central axis of the cylindrical vessel and means is provided in the area where the said one end of the vessel opens to the vessel for capturing the substance having a different density.

The said other end of the fluid passage may be disposed either at the inlet end portion or the outlet portion of the vessel. In the case where the said other end is positioned at the inlet portion of the vessel, it is preferred that the subject end is provided so as to project axially into the vessel. The capturing means may be in the form of an annular groove extending in a peripheral direction of the vessel. It is also preferred that opening means is provided in the groove to open the groove to the vessel. It is further preferred that a blade member is provided along the opening means.

In a cyclone separator, a low pressure is produced in the diametrically central portion of the cylindrical vessel. The low pressure produces a suction in the fluid passage so that a fluid flow is produced from the said one end to the other end of the fluid passage. The fluid flow along the wall surface of the vessel contains a lot of substance to be separated. This flow is drawn into the fluid passage so the the substance having a different density is captured by the capturing means.

The above and other objects and features of the present invention will become apparent from the following description of a preferred embodiment taking reference to the accompanying drawings.

DESCRIPTION OF THE PREFERRED EMBODIMENT

Figure 1:
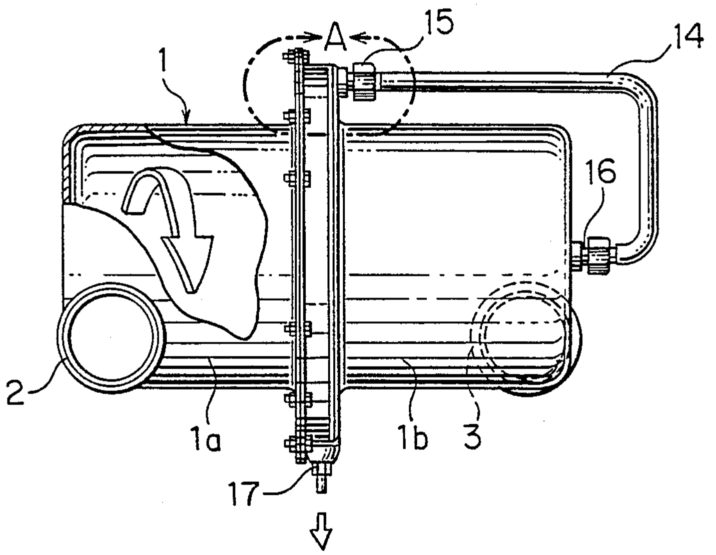
FIG. 1 is a side view of a cyclone separator in accordance with one embodiment of the present invention.
Figure 2:
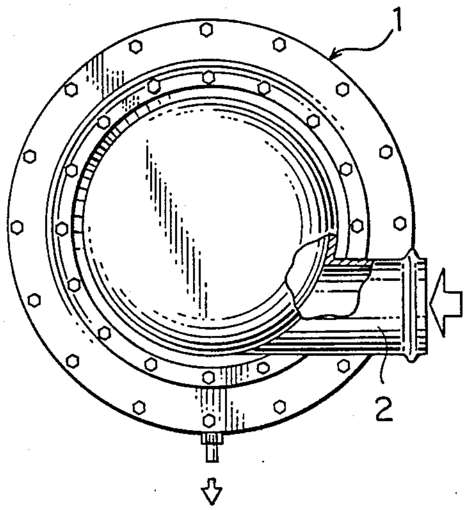
FIG. 2 is an end view showing the inlet portion of the separator.
Figure 3:
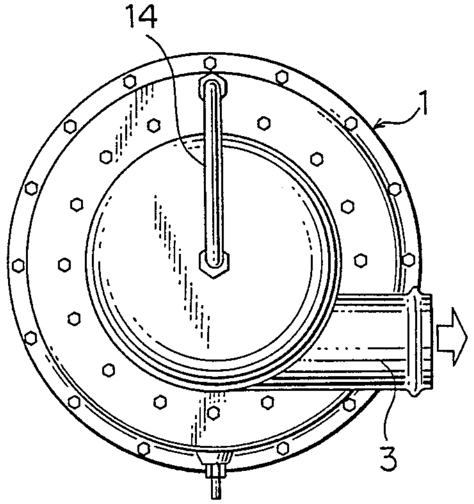
FIG. 3 is an end view showing the outlet portion of the separator.

Referring to the drawings, particularly to FIGS. 1 through 3, there is shown a water separator for use in an air conditioning system. The water separator shown therein is a cyclone type and includes a cylindrical vessel 1 which is provided at one axial end with a tangentially oriented inlet 2 and at the other axial end with an outlet 3. As shown by an arrow in FIG. 2, humid or water-containing air is introduced from the inlet 2 tangentially into the vessel 1 and produces a swirling flow as shown by an arrow in FIG. 1. The swirling flow is directed to the outlet 3 and the air flows out through the outlet 3 as shown by an arrow in FIG. 3.

Figure 4:
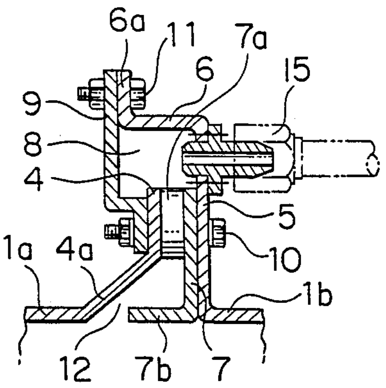
FIG. 4 is a sectional view of the part marked by A in FIG. 1.

The vessel a is constituted by a vessel half 1*a* which provides the inlet 2 and a vessel half 1*b* which provides the outlet 3. FIG. 4 shows the connection between the vessel halves 1*a* and 1*b*. As shown, the vessel half 1*a* is formed at an end adjacent to the vessel half 1*b* with a radially outwardly extending flange 4 which has a conical portion 4*a* contiguous to the cylindrical portion of the vessel half 1*a*. The vessel half 1*b* is formed at an end adjacent to the vessel half 1*a* with a radially outwardly extending flange 5 which is contiguous at the radially outer periphery with a cylindrical portion 6 having a diameter larger than the diameter of the cylindrical portion forming the body of the vessel half 1*b*.

Figure 5:
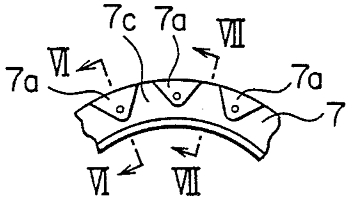
FIG. 5 is a front view showing a portion of the spacer.
Figure 6:
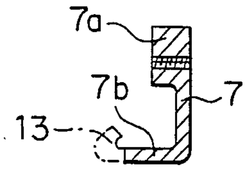
FIG. 6 is a sectional view taken along the line VI—VI in FIG. 5.
Figure 7:
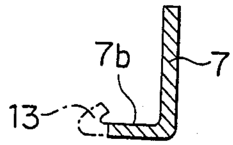
FIG. 7 is a sectional view taken along the line VII—VII in FIG. 5.

The flanges 4 and 5 are mated with each other with a spacer 7 interposed therebetween. A connecting flange 6*a* is formed at an axial end of the cylindrical portion 6 and a connecting ring 9 is provided to extend between the connecting flange 6*a* and the flange 4 of the vessel half 1*a*. As shown in FIGS. 5 through 7, the spacer 7 is in the form of a ring having an L-shaped cross section. A plurality of spacer blocks 7*a* are formed with spacings in circumferential direction. Referring to FIG. 4, it will be noted that the flanges 4 and 5 of the vessel halves 1*a* and 1*b*, respectively, are arranged with the spacer blocks 7*a* of the spacer 7 interposed therebetween and connected together by means of connecting bolts 10. The connecting ring 9 is connected at the outer peripheral portion with the connecting flange 6*a* through connecting bolts 11. Thus, there is provided an annular groove 8 between the flange 4 of the vessel half 1*a* and the flange 5 and the cylindrical portion 6 of the vessel half 1*b* for capturing water.

In the illustrated embodiment, there is provided at the radially inner periphery of the spacer 7 with a blade member 7*b* which is located flush with the inner surface of the vessel half 1*a*. The blade member 7*b* is located so that the edge of the blade member 7*b* forms a gap 12 with the conical portion 4*a* of the vessel half 1*a*. The gap 12 is communicated with the groove 8 through a passage 7*c* formed between each adjacent spacer blocks 7*a* of the spacer 7. As shown by phantom lines in FIGS. 6 and 7, the edge portion of the blade 7*b* of the spacer 7 may be bent back to form a trouph. In the illustrated embodiment, the groove 8 and the blade member 7*b* provides means for capturing water.

A pipe member 14 is provided for forming an air passage and has one end 15 connected to the flange 5 of the vessel half 1*b* to open to the groove 8. The other end 16 of the pipe member 14 is connected to the vessel half 1*b* to open to the vessel 1 at the center of the end of the vessel 1 adjacent to the outlet 3. In the illustrated embodiment, the vessel 1 is laid with the longitudinal axis substantially horizontally as shown in FIG. 1. In this arrangement, a drain port 17 is formed to open at the lowest position of the groove 8. In the illustrated embodiment, only one pipe member 14 is provided for forming the air passage, however, a plurality of pipe members 14 may be provided without difficulty except the area in the vicinity of the drain port 17.

In operation of the cyclone separator in this embodiment, water-containing air is introduced from the inlet 2 tangentially into the vessel 1. The air produces a swirl in the vessel so that a portion of the air having a high water concentration is concentrated along the inner wall surface of the vessel 1. At the center of cross-section of the vessel 1 or along the axis of the cylindrical vessel, there is produced a low pressure so that a relatively high pressure difference prevails between the center of crosssection of the vessel 1 and the area along the inner wall surface of the vessel 1. As the result, there is produced in the pipe 14 forming the air passage a circulating flow from the end 15 to the end 16. The air which prevails in the area along the inner wall surface and has a high water concentration is drawn into the groove 8 and water is separated from the air at the spacer 7 having the blade 7*b* and the groove 8. The water thus separated from the air flows circumferentially along the blade 7*b* to the drain port 17 to be discharged. The separator thus discussed is advantageous in that there is nothing which projects into the interior space of the vessel 1 so that the water separation can be carried out with a minimum pressure loss. An air circulation is produced by an effective utilization of the low pressure which is produced in the central portion of the vessel 1 and the portion of the air around the inner wall surface of the vessel 1 is drawn to the water capturing groove under the action of the circulating flow. It is therefore possible to accomplish an effective water separation. The structure is simple because it is simply required to form a groove 8 around the vessel for capturing water and connect the groove 8 to the cross-sectional center of the vessel 1 by means of a pipe 14. It is therefore possible to manufacture the separator easily with a low manufacturing cost.

Figure 8:
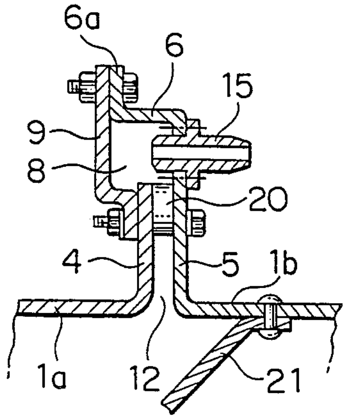
FIG. 8 is a sectional view similar to FIG. 4 but showing another embodiment of the present invention.

Referring to FIG. 8, there is shown another embodiment of the present invention. In this embodiment, a plurality of spacer blocks 20 are provided at circumferentially spaced positions between the flanges 4 and 5 of the vessel halves 1*a* and 1*b*. The groove 8 is communicated with the interior space of the vessel 1 through a gap 12. A blade 21 of a ring shape is provided along the gap 12. The blade 21 projects obliquely into the interior space of the vessel 1. In this embodiment, the groove 8 and the blade 21 form separate water capturing means.

Figure 9:
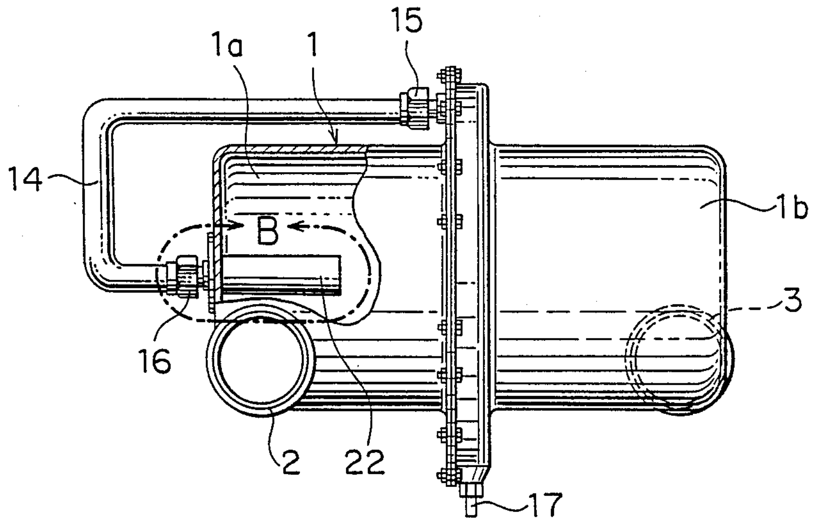
FIG. 9 is a view similar to FIG. 1 but showing a further embodiment; and, FIG. 10 is an enlarged view of the portion B in FIG. 9.
Figure 10:
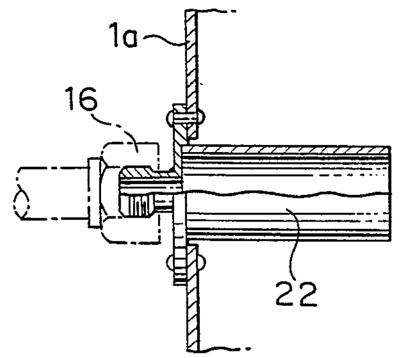

FIGS. 9 and 10 show a further embodiment of the present invention in which the pipe 14 for connecting the groove around the vessel 1 to the interior of the vessel 1 is connected to the vessel at the end of the vessel adjacent to the inlet 2. The vessel 1 is provided at the end adjacent to the inlet 2 with a pipe member 22 which projects axially into the vessel 1. The pipe 14 has an end 16 connected with the pipe member 22. The pipe member 22 extends axially into the vessel 1 so that it does not disturb the swirling air flow in the vessel. It is therefore possible to accomplish the water separation with minimum pressure loss.

In the foregoing description, the separator has been describes mostly with reference to examples wherein the separator is used for a water separator for an air conditioning system. It should however be noted that the invention is not limited to the use of the separator for this purpose but can be used for separating from fluid a substance having a density different from the density of the fluid. It should further be noted that the invention is in no way limited to the details of the illustrated structures but changes and modifications may be made without departing from the scope of the appended claims.

We claim:

1. A cyclone separator comprising a cylindrical vessel, inlet means opening to said vessel substantially tangentially at one end portion of the vessel, outlet means opening to said vessel at the other end portion of the vessel, whereby fluid is introduced substantially tangentially from said inlet means to produce a swirl of the fluid so that a substance having a density different from density of said fluid is separated under an action of the swirl, characterized by at least one fluid passage having one end opening at an outer periphery of said vessel and the other end opening at or in the vicinity of a longitudinal axis of said vessel, and capturing means provided at a portion where said one end of the fluid passage opened to said vessel for capturing said substance having the different density.

2. A cyclone separator in accordance with claim 1 in which said other end of the fluid passage is located in an end of the vessel adjacent to the outlet means.

3. A cyclone separator in accordance with claim 1 in which said other end of the fluid passage is located in an end of the vessel adjacent to the inlet means.

4. A cyclone separator in accordance with claim 1 in which said other end of the fluid passage is located to project into the vessel in an axial direction of the vessel.

5. A cyclone separator in accordance with claim 1 in which said capturing means is constituted by annular groove means opening to said vessel and extending in a circumferential direction of the vessel.

6. A cyclone separator in accordance with claim 5 in which said capturing means includes blade means provided at an area where said groove means opens to said vessel, said blade means being substantially flush with an inner surface of the vessel.

7. A cyclone separator in accordance with claim 6 in which said blade means has an edge which is bent to form trough means.

8. A cyclone separator in accordance with claim 5 in which said capturing means includes blade means extending from an inner surface of the vessel obliquely into the vessel substantially along a portion where the groove means opens to said vessel.

9. A cyclone separator in accordance with claim 1 in which said fluid passage is formed by a pipe member arranged exterior of said vessel.

10. A cyclone separator in accordance with claim 1 in which said outlet means is provided substantially tangentially with respect to said vessel.

* * * * *